(12) United States Patent
Le et al.

(10) Patent No.: US 11,487,999 B2
(45) Date of Patent: Nov. 1, 2022

(54) SPATIAL-TEMPORAL REASONING THROUGH PRETRAINED LANGUAGE MODELS FOR VIDEO-GROUNDED DIALOGUES

(71) Applicant: salesforce.com, inc., San Francisco, CA (US)

(72) Inventors: Hung Le, Singapore (SG); Chu Hong Hoi, Singapore (SG)

(73) Assignee: Salesforce.com, Inc., San Francisco, CA (US)

( * ) Notice: Subject to any disclaimer, the term of this patent is extended or adjusted under 35 U.S.C. 154(b) by 366 days.

(21) Appl. No.: 16/860,977

(22) Filed: Apr. 28, 2020

(65) Prior Publication Data

US 2021/0174162 A1    Jun. 10, 2021

Related U.S. Application Data

(60) Provisional application No. 62/945,483, filed on Dec. 9, 2019.

(51) Int. Cl.
| | |
|---|---|
| *G06N 3/04* | (2006.01) |
| *G06N 3/08* | (2006.01) |
| *G06F 40/40* | (2020.01) |
| *H04N 19/31* | (2014.01) |
| *H04N 19/33* | (2014.01) |
| *G06V 20/40* | (2022.01) |

(52) U.S. Cl.
CPC .............. *G06N 3/049* (2013.01); *G06F 40/40* (2020.01); *G06N 3/08* (2013.01); *G06V 20/40* (2022.01); *H04N 19/31* (2014.11); *H04N 19/33* (2014.11)

(58) Field of Classification Search
CPC ........ G06N 3/049; G06N 3/08; G06N 3/0454; G06N 3/0472; G06F 40/40; G06F 40/30; G06V 20/40; G06V 10/82; G06V 20/46; H04N 19/31; H04N 19/33; H04N 19/90; H04N 19/46; G06K 9/6271
See application file for complete search history.

(56) References Cited

U.S. PATENT DOCUMENTS

| | | | |
|---|---|---|---|
| 10,282,663 | B2 | 5/2019 | Socher et al. |
| 10,474,709 | B2 | 11/2019 | Paulus |
| 10,521,465 | B2 | 12/2019 | Paulus |
| 10,542,270 | B2 | 1/2020 | Zhou et al. |
| 10,558,750 | B2 | 2/2020 | Lu et al. |

(Continued)

OTHER PUBLICATIONS

Alberti et al., "Fusion of Detected Objects in Text for Visual Question Answering," arXiv preprint arXiv:1908.05054, pp. 1-10, 2019.

(Continued)

*Primary Examiner* — Thierry L Pham
(74) *Attorney, Agent, or Firm* — Haynes and Boone, LLP

(57) ABSTRACT

A system and method for generating a response in a video grounded dialogue are provided. A video-grounded dialogue neural network language model receives video input and text input. The text input includes a dialogue history between the model and a human user and a current utterance by the user. Encoded video input is generated using video encoding layers. Encoded text input is generated using text encoding layers. The encoded video input and the encoded text input are concatenated in to a single input sequence. A generative pre-trained transformer model generates the response to the current utterance from the singe input sequence.

20 Claims, 4 Drawing Sheets

(56) References Cited

U.S. PATENT DOCUMENTS

| | | |
|---|---|---|
| 10,565,305 B2 | 2/2020 | Lu et al. |
| 10,565,306 B2 | 2/2020 | Lu et al. |
| 10,565,318 B2 | 2/2020 | Bradbury |
| 10,565,493 B2 | 2/2020 | Merity et al. |
| 10,573,295 B2 | 2/2020 | Zhou et al. |
| 10,592,767 B2 | 3/2020 | Trott et al. |
| 10,699,060 B2 | 6/2020 | Mccann |
| 10,747,761 B2 | 8/2020 | Zhong et al. |
| 10,776,581 B2 | 9/2020 | Mccann et al. |
| 10,783,875 B2 | 9/2020 | Hosseini-Asl et al. |
| 2016/0350653 A1 | 12/2016 | Socher et al. |
| 2017/0024645 A1 | 1/2017 | Socher et al. |
| 2017/0032280 A1 | 2/2017 | Socher |
| 2017/0140240 A1 | 5/2017 | Socher et al. |
| 2018/0096219 A1 | 4/2018 | Socher |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0268287 A1 | 9/2018 | Johansen et al. |
| 2018/0268298 A1 | 9/2018 | Johansen et al. |
| 2018/0336453 A1 | 11/2018 | Merity et al. |
| 2018/0373682 A1 | 12/2018 | Mccann et al. |
| 2018/0373987 A1 | 12/2018 | Zhang et al. |
| 2019/0130248 A1 | 5/2019 | Zhong et al. |
| 2019/0130249 A1 | 5/2019 | Bradbury et al. |
| 2019/0130273 A1 | 5/2019 | Keskar et al. |
| 2019/0130312 A1 | 5/2019 | Xiong et al. |
| 2019/0130896 A1 | 5/2019 | Zhou et al. |
| 2019/0188568 A1 | 6/2019 | Keskar et al. |
| 2019/0213482 A1 | 7/2019 | Socher et al. |
| 2019/0251431 A1 | 8/2019 | Keskar et al. |
| 2019/0258714 A1 | 8/2019 | Zhong et al. |
| 2019/0258939 A1 | 8/2019 | Min et al. |
| 2019/0286073 A1 | 9/2019 | Asl et al. |
| 2019/0355270 A1 | 11/2019 | Mccann et al. |
| 2019/0362020 A1 | 11/2019 | Paulus et al. |
| 2020/0005765 A1 | 1/2020 | Zhou et al. |
| 2020/0057805 A1 | 2/2020 | Lu et al. |
| 2020/0065651 A1 | 2/2020 | Merity et al. |
| 2020/0084465 A1 | 3/2020 | Zhou et al. |
| 2020/0089757 A1 | 3/2020 | Machado et al. |
| 2020/0090033 A1 | 3/2020 | Ramachandran et al. |
| 2020/0090034 A1 | 3/2020 | Ramachandran et al. |
| 2020/0103911 A1 | 4/2020 | Ma et al. |
| 2020/0104643 A1 | 4/2020 | Hu et al. |
| 2020/0104699 A1 | 4/2020 | Zhou et al. |
| 2020/0105272 A1 | 4/2020 | Wu et al. |
| 2020/0117854 A1 | 4/2020 | Lu et al. |
| 2020/0117861 A1 | 4/2020 | Bradbury |
| 2020/0142917 A1 | 5/2020 | Paulus |
| 2020/0175305 A1 | 6/2020 | Trott et al. |
| 2020/0184020 A1 | 6/2020 | Hashimoto et al. |
| 2020/0234113 A1 | 7/2020 | Liu |
| 2020/0272940 A1 | 8/2020 | Sun et al. |
| 2020/0285704 A1 | 9/2020 | Rajani et al. |
| 2020/0285705 A1 | 9/2020 | Zheng et al. |
| 2020/0285706 A1 | 9/2020 | Singh et al. |
| 2020/0285993 A1 | 9/2020 | Liu et al. |
| 2020/0302178 A1 | 9/2020 | Gao et al. |
| 2020/0302236 A1 | 9/2020 | Gao et al. |

OTHER PUBLICATIONS

Antol et al., "VQA: Visual Question Answering," In Proceedings of the IEEE International Conference on Computer Vision, pp. 2425-2433, 2015.

Budzianowski et al., "Hello, It's GPT-2—How Can I Help You? Towards the Use of Pre-trained Language Models for Task-Oriented Dialogue Systems," In Proceedings of the 3rd Workshop on Neural Generation and Translation, Hong Kong, Association for Computational Linguistics, pp. 15-22, 2019.

Chao et al., "BERT-DST: Scalable End-to-End Dialogue State Tracking with Bidirectional Encoder Representations from Transformer," arXiv preprint arXiv:1907.03040, pp. 1-5, 2019.

Chen et al.,"Uniter: Learning Universal Image-Text Representations," arXiv preprint arXiv:1909.11740, pp. 1-13, 2019.

Devlin et al., "Bert: Pre-training of Deep Bidirectional Transformers for Language Understanding," In Proceedings of the 2019 Conference of the North American Chapter of the Association for Computational Linguistics: Human Language Technologies, vol. 1 (Long and Short Papers), Minneapolis, Minnesota. Association for Computational Linguistics, pp. 4171-4186, 2019.

Hara et al., "Can Spatiotemporal 3d CNNs Retrace the History of 2D CNNS and ImageNet?," In Proceedings of the IEEE conference on Computer Vision and Pattern recognition, pp. 6546-6555, 2018.

He et al., "Deep Residual Learning for Image Recognition," In Proceedings of the IEEE Conference on Computer Vision and Pattern Recognition, pp. 770-778, 2016.

Hori et al., "End-to-End Audio Visual Scene-Aware Dialog using Muiltimodal Attention-Based Video Features," In ICASSP 2019—2019 IEEE International Conference on Acoustics, Speech and Signal Processing (ICASSP), pp. 2352-2356, 2019.

Huang et al., "Densely Connected Convolutional Networks," In Proceedings of the IEEE Conference on Computer Vision and Pattern Recognition, pp. 4700-4708, 2017.

Lai et al., "A Simple but Effective BERT Model for Dialog State Tracking on Resource-Limited Systems," arXiv preprint arXiv:1910.12995, pp. 105, 2019.

Lan et al., Albert: A Lite BERT for Self-Supervised Learning of Language Representations, arXiv preprint arXiv:1909.11942, pp. 1-16, 2019.

Le et al., "Multimodal Transformer Networks for End-to-End Video-Grounded Dialogue System," In Proceedings of the 57th Annual Meeting of the Association for Computational Linguistics, Florence, Italy. Association for Computational Linguistics, pp. 5612-5623, 2019.

Li et al., "Unicoder-VL: A Universal Encoder for Vision and Language by Cross-modal Pre-training," arXiv preprint arXiv:1908.06066, pp. 1-8, 2019.

Liu et al., "RoBERTa: A Robustly Optimized BERT Pretraining Approach," arXiv preprint arXiv:1907.11692, pp. 1-13, 2019.

Lu et al., "ViIBERT: Pretraining Task-Agnostic Visiolinguistic Representations for Vision-and-Language Tasks," In Advances in Neural Information Processing Systems, pp. 13-23, 2019.

Radford et al, "Language Models are Unsupervised Multi-Task Learners," pp. 1-24, 2019.

Sanabria et al., "CMU Sinbad's Submission for the DSTC7 AVSD Challenge," In DSTC7 at AAA/2019 Workshop, vol. 6, pp. 1-7, 2019.

Sigurdsson et al., "Hollywood in Homes: Crowdsourcing Data Collection for Activity Understanding," In European Conference on Computer Vision, Springer, pp. 1-18, 2016.

Su et al., "VL-BERT: Pre-Training of Generic Visual-Linguistic Representations," arXiv preprint arXiv:1908.08530, pp. 1-16, 2019.

Sun et al., "VideoBERT: A Joint Model for Video and Language Representation Learning," In The IEEE International Conference on Computer Vision (ICCV), arXiv:1904.01766, 2019, pp. 1-13.

Vaswani et al., "Attention is All You Need," 31st Conference on Neural Information Processing Systems, pp. 1-15, 2017.

Whang et al., "An Effective Domain Adaptive Post-Training Method for BERT in Response Selection," arXiv preprint arXiv:1908.04812, pp. 1-5, 2019.

Wolf et al., "TransferTransfo: A Transfer Learning Approach for Neural Network based Conversational Agents," arXiv preprint arXiv:1901.08149, pp. 1-6, 2019.

Xie et al., "Aggregated Residual Transformations for Deep Neural Networks," In Proceedings of the IEEE Conference on Computer Vision and Pattern Recognition, pp. 1492-1500, 2017.

| Model | Spatial | Temporal | MIM | MVM | MVT | BLEU1 | BLEU2 | BLEU3 | BLEU4 | METEOR | ROUGE-L | CIDEr |
|---|---|---|---|---|---|---|---|---|---|---|---|---|
| AVSD Winner | | | | | | 0.718 | 0.584 | 0.478 | 0.394 | 0.267 | 0.563 | 1.094 |
| MTN | | | | | | 0.731 | 0.597 | 0.490 | 0.406 | 0.271 | 0.564 | 1.127 |
| GPT-2 (S) | ✓ | | | | | 0.750 | 0.621 | 0.516 | 0.433 | 0.282 | 0.581 | 1.196 |
| GPT-2 (S) | ✓ | ✓ | | | | 0.753 | 0.619 | 0.512 | 0.427 | 0.283 | 0.573 | 1.185 |
| GPT-2 (S) | ✓ | ✓ | ✓ | | | 0.750 | 0.616 | 0.511 | 0.427 | 0.281 | 0.570 | 1.183 |
| GPT-2 (S) | ✓ | ✓ | | ✓ | | 0.753 | 0.613 | 0.508 | 0.422 | 0.274 | 0.571 | 1.172 |
| GPT-2 (S) | ✓ | ✓ | | | ✓ | 0.749 | 0.615 | 0.510 | 0.424 | 0.281 | 0.577 | 1.156 |
| GPT-2 (M) | ✓ | ✓ | ✓ | ✓ | ✓ | 0.744 | 0.613 | 0.505 | 0.421 | 0.283 | 0.568 | 1.192 |

FIG. 4

SPATIAL-TEMPORAL REASONING THROUGH PRETRAINED LANGUAGE MODELS FOR VIDEO-GROUNDED DIALOGUES

RELATED APPLICATIONS

This application claims priority to U.S. Provisional patent Application No. 62/945,483, filed Dec. 9, 2019, which is incorporated by reference herein in its entirety.

TECHNICAL FIELD

The disclosure relates generally to machine learning models and neural networks, and more specifically, to spatial-temporal reasoning through pretrained language models for video-grounded dialogues.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Artificial intelligence, implemented with neural networks and deep learning models, has demonstrated great promise as a technique for automatically analyzing real-world information with human-like accuracy. Video-grounded dialogue is one application or task to which neural networks may be applied. In a video-grounded dialogue task, a neural network model which is or may be coupled to a computer agent engages in a natural language dialogue or "conversation" with a human user regarding one or more videos.

BRIEF DESCRIPTION OF THE DRAWINGS

FIG. 4 is a table that illustrates an improvement in using the video-grounded dialogue model over conventional models, according to some embodiments.

Figure 1:
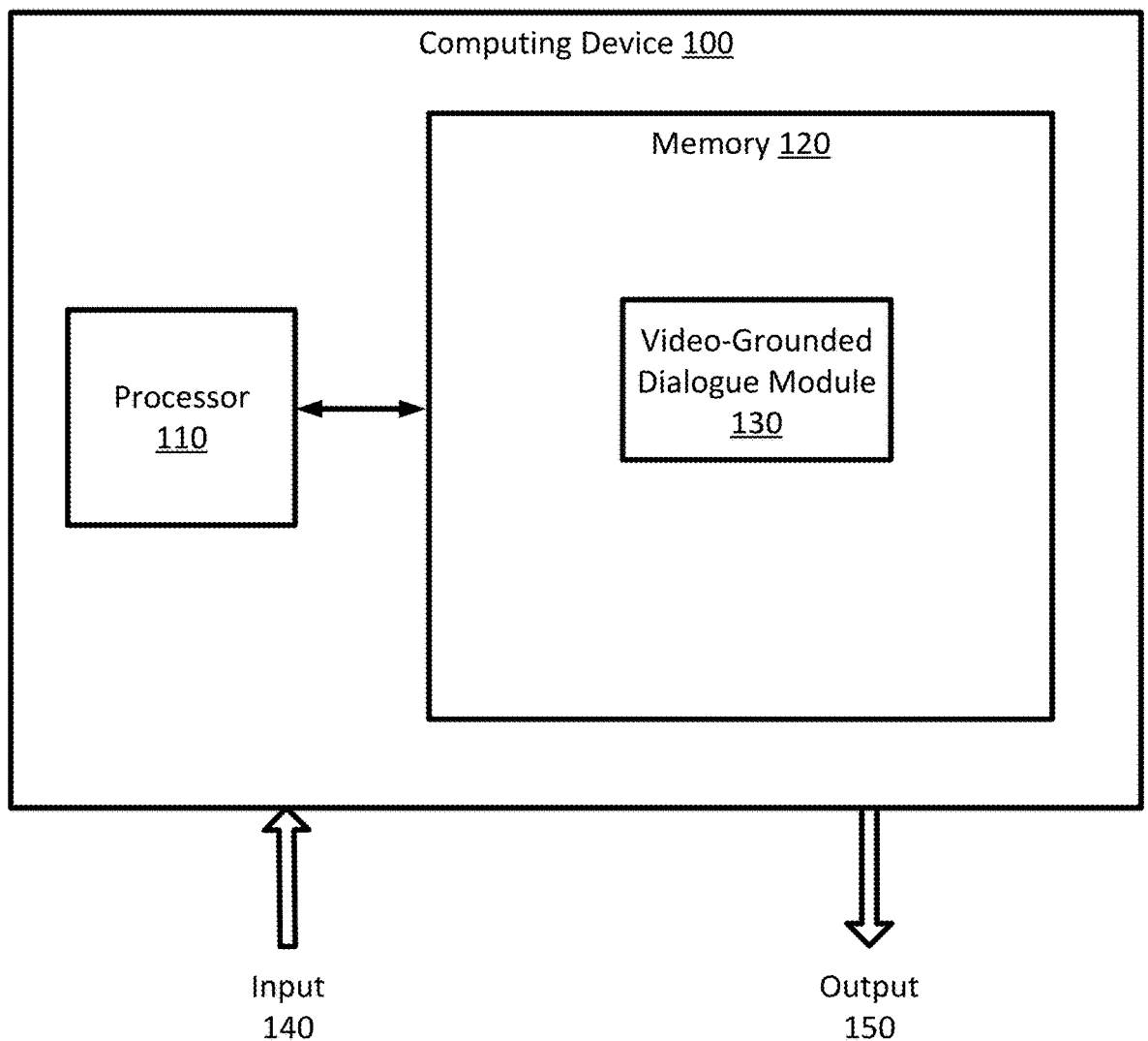
FIG. 1 is a simplified diagram of a computing device according to some embodiments.

In the figures and appendix, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Artificial intelligence, implemented with neural networks and deep learning models, has demonstrated great promise as a technique for automatically analyzing real-world information with human-like accuracy. In general, such neural network and deep learning models receive input information and make predictions based on the same. Whereas other approaches to analyzing real-world information may involve hard-coded processes, statistical analysis, and the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications.

Video-grounded dialogue is one application or task to which neural networks may be applied. In a video-grounded dialogue task, a neural network model that executes within or is coupled to an agent engages in a natural language dialogue or "conversation" with a human user regarding one or more videos. The embodiments below describe a video-grounded dialogue where a neural network model may converse with humans not only based on signals from natural language but also from other modalities such as sound and vision. Video-grounded dialogue tasks may be considered or viewed as an extension of video question-answering (QA) where the agent (using the video-grounded neural network) answers questions from humans over multiple turns of dialogue. This is a complex task for machines because the machines need to possess not only strong language understanding to generate natural responses but also sophisticated reasoning of video information, including the related objects, their positions and actions, etc. Compared to image-based natural language processing (NLP) tasks, video-grounded dialogues are more challenging as the feature representation of a video involves both spatial and temporal information. A dialogue agent must reason on both dimensions and address the two major problems: "where to look" (spatial reasoning) and "when to look" (temporal reasoning) in the video.

The conventional approaches for video-grounded dialogue focus on vision and language reasoning over temporal variance of input video and often neglect potential signals from a spatial dimension. Such drawback becomes more significant when the dialogue agent is required to reason over videos of extensive length and which involve many objects.

To address these challenges, the embodiments provide an approach or framework that formulates video-grounded dialogue tasks as a sequence-to-sequence task, combining both visual and textual representation into a structured sequence, and uses the structured sequence to fine-tune a large pre-trained neural network language model (e.g., Generative Pretrained Transformer 2 (GPT-2)). In some embodiments, the framework allows fine-tuning the language model to capture dependencies across multiple modalities over different levels of information, including spatial-temporal level in a video and token-sentence level in a dialogue context.

According to some embodiments, the systems and methods of the disclosure leverage the power of pre-trained language models and extend GPT-2 models to a video-grounded dialogue task which involves complex features of different dynamics: (1) video features which can extend across both spatial and temporal dimensions; and (2) dialogue features which involve semantic dependencies over multiple dialogue turns.

According to some embodiments, the systems of the disclosure including various networks, models, and modules can be implemented in one or more computing devices.

As used herein, the term "network" or "model" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a video-grounded dialogue module 130 that may be used to implement and/or emulate the neural network systems and models described further herein and/or to implement any of the methods described further herein. Video-grounded dialogue module 130 may be used, in some examples, for engaging in a natural language dialogue or "conversation" with a human user regarding one or more videos.

In some examples, video-grounded dialogue module 130 may be implemented using hardware, software, and/or a combination of hardware and software. As shown, computing device 100 receives input 140, which is provided to video-grounded dialogue module 130. Video-grounded dialogue module 130 may generate output 150. The video-grounded dialogue module 130 may include or is coupled to a dialogue agent which interacts with a human user.

In some embodiments, the input 140 may include video V and text T data. The text input T can include dialogue history of turns and a current human utterance. Each turn in a dialogue may include a pair of human utterance and dialogue agent response to the human utterance. The current human utterance is a question posed to the dialogue agent that has not yet received a response. The output 150 can include video-grounded dialogue module 130 response in natural language that can address current human utterance and create a coherent dialogue. The input video V can contain a video with features in different modalities, including vision, audio, and text (such as video caption or subtitle).

Figure 2:
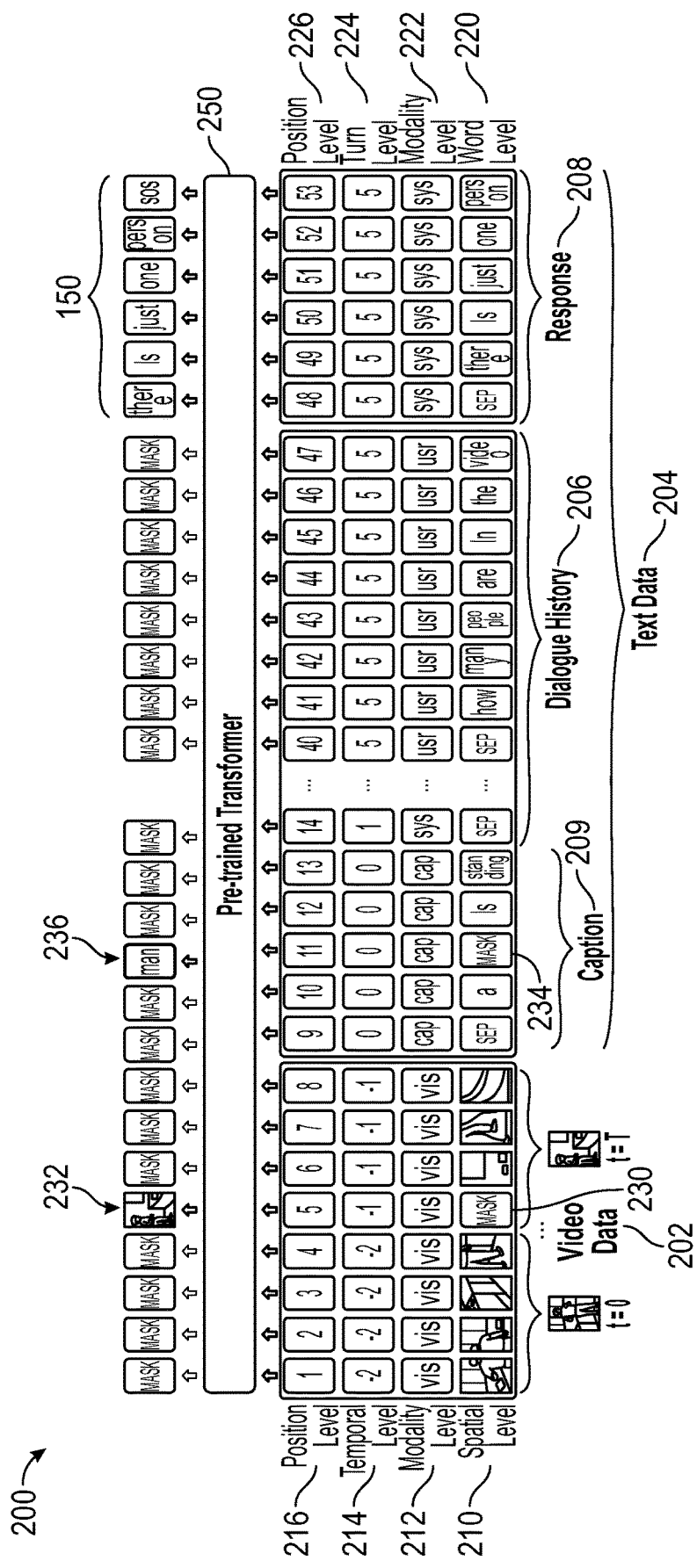
FIG. 2 is a simplified diagram of a model for video-grounded dialogue according to some embodiments.

FIG. 2 is a simplified diagram of an architecture or framework for a video-grounded dialogue model, according to some embodiments. In some embodiments, the model 200 may be implemented by video-grounded dialogue module 130 discussed in FIG. 1. The model 200 represents the dialogue between the human user and the model as a series of video-grounded dialogue tasks. Each video-grounded dialogue task is represented as a sequence-to-sequence task which combines both visual and textual representation into a structured sequence. As will be discussed below, the video-grounded dialogue task that includes the combined visual and textual representation may be fine-tuned using multiple encoding layers before being fed into a large pre-trained neural network language model (e.g., Generative Pretrained Transformer 2 (GPT-2) model).

In some embodiments, the video-grounded dialogue model 200 may receive video data V 202 and text data T 204 as input 140 discussed in FIG. 1. The video data V 202 may include one or more video frames or video segments. The text data T 204 can include a portion of a dialogue history 206 between the model 200 and a human user. The dialogue history 206 may include one or more turns between a human utterance and a model 200 response 208. In some embodiments, the text sequences may also include a current human utterance for which the model 200 should provide a response. The text data T 204 may also include one or more video captions C 209 relating or corresponding to the video data V 202.

In some embodiments, the model 200 framework allows for fine-tuning the language model to capture dependencies across multiple modalities over different levels of information, including spatial-temporal level in video, and token-sentence level in dialogue context. In some embodiments, the framework for video-grounded dialogue model 200 can be based on or implemented with a pre-trained transformer model 250 such as a Generating Pre-trained Transformer (GPT) model. In some examples, the pre-trained transformer model 250 is trained on the basis of the GPT-2 architecture. The GPT-2 model is based on a transformer network, which can include a plurality (e.g., 12 to 24) layers of masked multi-head attention on very large text data. The GPT-2 model is adapted to generate a video-grounded dialogue response the current human utterance, which is output 150.

In some embodiments, video-grounded dialogue model 200 includes one or more layers 210-216 for performing various encoding on the video data V 202 and 220-226 for performing various encoding on the text data T 204 before feeding the encodings into GPT model 250. The input components, text data T 204 and video data V 202 are first modified as a long sequence of video frames (or video segments) and dialogue turns. In some embodiments, the model 200 formulates video-grounded dialogue tasks as a sequence-to-sequence task, combining both visual and textual representation of text data T 204 and video data V 202 into a structured sequence. In some embodiments, the video data V 202 and text data T 204 are combined together over multiple encoding layers 210-216 and 220-226 of the model 200, where layers 210-220 inject different attributes into encoded features. For video data V 202, encoding layers 210-216 include spatial level encoding layer 210, modality level encoding layer 212, temporal level encoding layer 214, and position level encoding layer 216. For text data T 204, encoding layers 220-226 include word level encoding layer 220, modality level encoding layer 222, turn level encoding layer 224, and position level encoding layer 226.

The spatial level encoding layer 210 of the video-grounded dialogue model 200 performs spatial-level encoding on video data V 202. The spatial level encoding layer 210 may include a pre-trained video model, such as a pre-trained 2D CNN or 3D CNN video model and an RELU activation layer. In some embodiments, each video frame or video segment is can be structured as a sequence of spatial regions, which can be extracted using pre-trained video model. For input video data V 202, the output of a pre-trained 2D CNN or 3D CNN video model may be denoted as $Z_V^{re} \in \mathbb{R}^{F \times P \times d_{emb}}$, where $d_{emb}$ is the feature dimension of the pre-trained video model, F is the resulting number of sampled video frames or video segments, and P is the number of spatial regions in each video frame. With reference to FIG. 2, the F may be T sampled video frames and P may be four spatial regions for each video frame. The output $Z_V$ of the 2D CNN or 3D CNN video model may further be reshaped as a sequence of image patches by passing the output $Z_V$ through a linear transformation with rectified linear activation unit (ReLU) activation to match the feature dimension d of pre-trained transformer model 250. The output of linear transformation with ReLU activation is the spatial level features of the video data V 202. The transformation of video data V 202 into $Z_V^{spatial}$ is shown below:

$$Z_V^{spatial} = \text{ReLU}(Z_V^{pre} W_V) \in \mathbb{R}^{FP \times d} \qquad \text{Equation 1}$$

where $W_V \in \mathbb{R}^{d_{emb} \times d}$. This is denoted as spatial level features of input video.

The modality level encoding layer 212 performs modality encoding on video data V 202. Modality-level encoding informs the type of information that is video data V 202. For example, modality-level encoding layer 212 may use a modality token "vis" to uniformly represent that video data V 202. The modality toke "vis" indicates that the information type is visual.

The temporal-level encoding layer 214 performs temporal encoding on input video data V 202. The temporal encoding relates to the frame-level (or segment-level) position of input features in the video data V 202. Thus, each frame in video data V 202 may have different temporal encodings, while the segments within each frame may have the same temporal encodings.

The position-level encoding layer 216 performs position encoding on video data V 202. The position-level encoding incorporates the spatial-level ordering of frames and segments within each frame. Thus each spatial region within each frame and among frames would have a different position-level encoding. The position encoding of input video data V 202 may be equivalent to the positional encoding of tokens in sentences seen in BERT-based language models.

In some embodiments, modality level encoding layer 212, temporal level encoding layer 214, and position level encoding layer 216 may be trainable parameters to enable model 200 learn the dynamics of input features in video data V 202. In some embodiments, modality level encoding layer 212, temporal level encoding layer 214, and position level encoding layer 216 may be modeled to have the same feature dimension d of pre-trained model. The encoding layers 210-216 may be combined through element-wise summation that is encoded video representation $Z_V$ shown below:

$$Z_V = Z_V^{spatial} + Z_V^{mod} + Z_V^{temporal} + Z_V^{pos} \qquad \text{Equation 2}$$

Further, some or all of the encodings from the modality level encoding layer 212, temporal level encoding layer 214, and position level encoding layer 216 may be included in the encoded video representation $Z_V$.

Video-grounded dialogue model 200 may also generate encoded text representation $Z_T$ by performing token-level encoding on the text data T 204 using one or more encoding layers. Example encoding layers may be word level encoding layer 220, modality level encoding layer 222, turn level encoding layer 224, and position level encoding layer 226.

Word level encoding layer 220 receives dialogue history H 206, responses S 208 and caption C 209 as input. Word level encoding layer 220 breaks down dialogue history H 206 as a sequence of dialogue turns $H = (H_1, H_2, \ldots, H_t)$ where t is the current dialogue turn. Each dialogue turn is represented as a pair of user utterance U and system response S 208 concatenated sequentially $H = ((U_1, S_1), (U_2, S_2), \ldots, U_{t-1}))$. $S_t$ is the target response that is to be generated by the model 200 in response to the current human utterance. Target response $S_t$ is output 150. Each utterance is then represented as a sequence of tokens (words) x so the dialogue history can be represented as $X_H = (x_1, x_2, \ldots x_{L_H})$ and as $S_t(y_1, y_2, \ldots y_{L_H})$, where $L_H$ and $L_Y$ are the total number of tokens in the dialogue history H 206 and target response respectively. Video caption C 209 is another text input. The video caption C 209 typically provides linguistic summary of the video in one or two sentences. The video caption C 209 can be represented as a sequence of tokens $X_C = (x_1, x_2, \ldots x_{L_C})$. In some embodiments, all text input sequences of text data 204 T are combined to form a single sequence $X_T = (X_C, X_H, Y_{-1})$ as input to the model 200. The $Y_{-1}$ is the shifted target response. The output of word level encoding layer 220 are embedded features of $X_T$ and can be denoted as $Z_T^{token}$ which is the token-level encoding layer of the input text data T 204.

In some embodiments, similar to the video features, modality level encoding layer 222, turn-level encoding layer 224, and position level encoding layer 226 are added to video-grounded dialogue model 200 to inject different attributes of $X_T$.

The modality level encoding layer 222 performs modality level encoding. The modality encoding differentiates segments in $X_T$. In some embodiments, modality level encoding layer 222 may use different modality tokens, such as modality tokens "cap," "sys," and "usr" to specify whether the token in the corresponding position in test data T 204 are part of video caption C 209, system responses S 208, or user utterance U respectively.

The turn level encoding layer 224 performs turn level encoding. The turn-level encoding encode the turn number of the token in the corresponding position. For example, in FIG. 2, the dialogue history 206 and response 208 are set to five, which indicates there were five pairs of user utterance U and system response S 208, and the current turn is 5. Thus, turn level encoding layer 224 sets the tokens that are included in utterance U and system response S 208 in turn five to five. In some embodiments, the video caption C 209 segment may have a turn level encoding set to zero.

The position level encoding layer 226 performs position-level encoding which inject attributes pertaining to the token ordering. The token ordering may continue from the ordering performed using the position level encoding layer 214 that generates spatial encodings that include spatial region orderings. As illustrated in FIG. 2, token ordering may continue with the next token number from the spatial ordering.

Similar to video representation, the text data T 204 that is encoded may be combined through element-wise summation that is encoded text representation $Z_T$ shown below:

$$Z_T = Z_T^{token} + Z_T^{mod} + Z_T^{turn} + Z_V^{pos} \quad \text{Equation 3}$$

Further, some or all of the encodings from the modality level encoding layer 224, turn level encoding layer 224, and position level encoding layer 226 may be included in the encoded video representation $Z_T$.

In some embodiments, video-grounded dialogue model 200 may concatenate the encoded video representation $Z_V$ and encoded text representation $Z_T$ into a single input sequence $Z_{VT}$. The length of the input sequence $Z_{VT}$ may be (F×P+$L_C$+$L_H$+$L_Y$) with an embedding dimension d. The single input sequence $Z_{VT}$ may be used as input to a pre-trained GPT-2 to fine-tune the GPT model 250 such as GPT-2.

Figure 3:
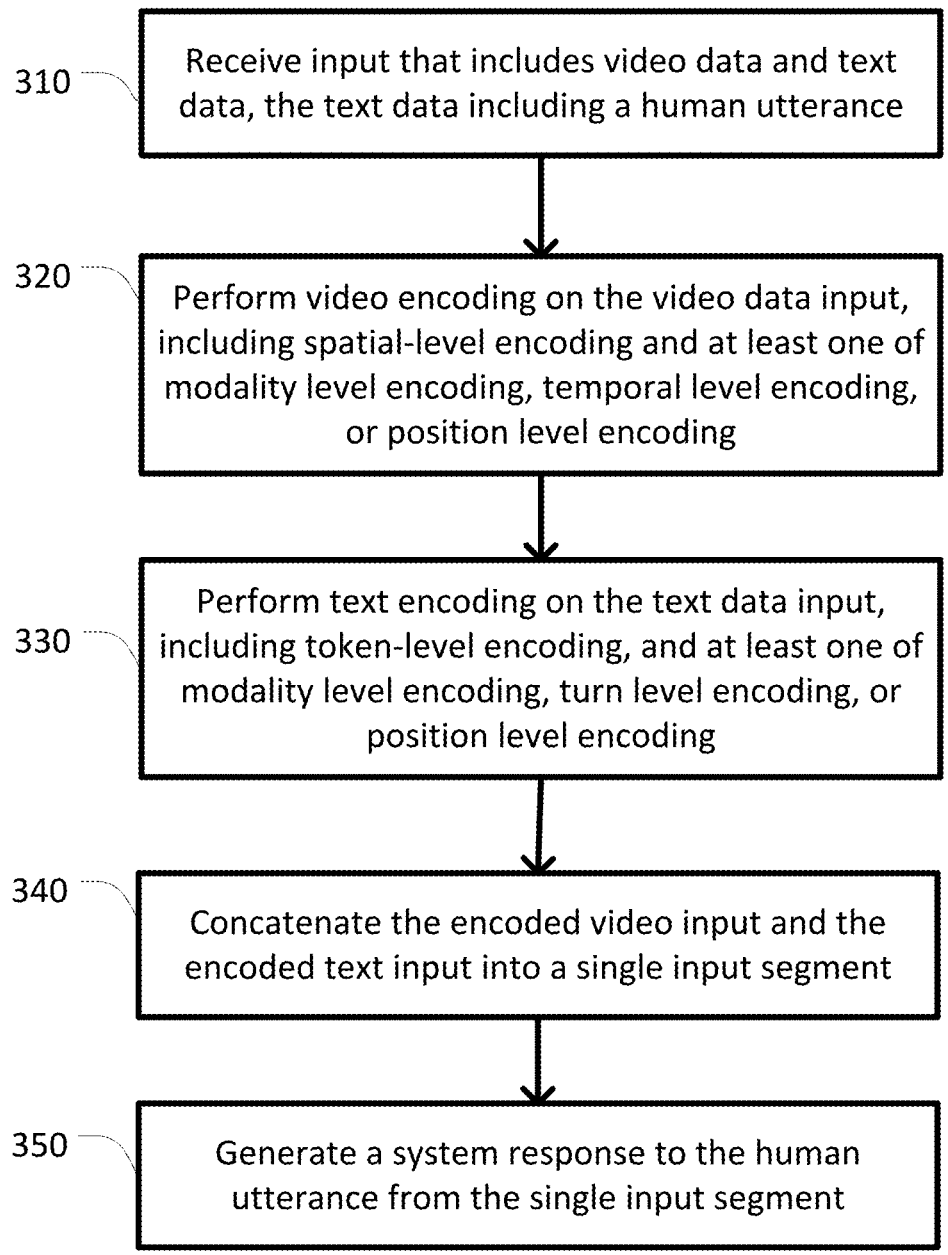
FIG. 3 is a simplified diagram of a method for video-grounded dialogue, according to some embodiments according to some embodiments.

FIG. 3 is a simplified diagram of a method 300 for video-grounded dialogue, according to some embodiments. In some embodiments, one or more of the processes of method 300 may be implemented, at least in part, in the form of executable code stored on non-transitory, tangible, machine-readable media that when run by one or more processors may cause the one or more processors to perform one or more of the processes. In some embodiments, method 300 corresponds to the operation of video-grounded dialogue module 130 (FIG. 1) or model 200 (FIG. 2) to perform a video-grounded dialogue task.

Some examples of computing devices, such as computing device 100 may include non-transitory, tangible, machine readable media that include executable code that when run by one or more processors (e.g., processor 110) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

At a process 310, the video input and text input are received. That is, the video-grounded dialogue model 200 may receive video data V 202 and text data T 204. As discussed above, the text data T 204 may include the dialogue history 206 between the model 200 and a human user, such as dialogue history that includes pairs of a human utterance and dialogue agent response generated by the video-grounded dialogue model 200. The test data T 205 may also include one or more captions 209 relating or corresponding to the video data V 202. The video data V 202 may include video in a form of video frames that is subject to the conversation between the human user and an agent in or coupled to video-grounded dialogue model 200.

At a process 320, video data is encoded. For example, the spatial level encoding layer 210 performs spatial-level encoding on the video data V 202 which encodes video data V 202 into spatial regions $Z_V^{spatial}$. As discussed above, spatial regions $Z_V^{spatial}$ may be generated using a pre-trained 2D CNN or 3D CNN video model with an output that is passed through a linear transformation with ReLU activation. The modality level encoding 312 encodes the spatial regions to have visual information type using a modality token "vis." The encodings of the modality level encoding layer 312 are modality encodings $Z_V^{mod}$. The temporal-level encoding layer 214 encodes the spatial regions into the frame-level (or segment-level) positions of input features of the frame or segment level. The output of the temporal level encoding layer 214 are temporal encodings $Z_V^{temporal}$. The position level encoding layer 216 encodes the spatial regions into spatial level ordering. The output of the position level encoding layer 216 are position encodings $Z_V^{pos}$. The combined encodings from the spatial level encoding layer 210, modality level encoding layer 212, temporal level encoding layer 214, and position level encoding layer 216 may be referred to as encoding representation $Z_V$. In some embodiments, the encoding representation $Z_V$ may include spatial encodings and at least one of modality encodings, temporal encodings, or position encodings.

At a process 330, the text data is encoded. For example, the word level encoding layer 220 breaks down dialogue history 206 in to a sequence of dialogue turns where each dialogue turn is represented as a pair of user utterance and response 208 and where each utterance and response are represented as a sequence of tokens. The word level encoding layer 220 also breaks down video caption 209 into tokens. Further, the tokens from the video captions C 209, user utterance in dialogue history 206 and response 208 may be combined into a single token sequence $X_T$, with the system response 208 being shifted to a previous response. The output of the word level encoding layer 220 are the token encodings $Z_T^{token}$. The modality level encoding layer 222 encodes the tokens in $X_T$ into modality tokens "cap," "sys," and "usr" that specify whether the token in the corresponding position are part of caption 209, response 208, or human utterance. The output of the modality level encoding layer 222 are modality encodings $Z_T^{mod}$. The turn level encoding layer 224 encodes the token with a turn number in a dialogue turn. The output of the turn level encoding layer 224 are turn encodings $Z_T^{turn}$. The position level encoding layer 226 injects the position encoding into the token ordering. The output of the position level encoding layer 226 are position encodings $Z_T^{pos}$. The combined encodings from the word level encoding layer 220, modality level encoding layer 222, turn level encoding layer 224, and position level encoding layer 226 may be referred to as encoding representation $Z_T$. In some embodiments, the encoding representation $Z_T$ may include token encodings and at least one of modality encodings, turn encodings, or position encodings.

At a process 340, the encoded video input and the encoded text input are concatenated in to a single input sequence. For example, video-grounded dialogue model 200 concatenates the encoded video data (encoding representation $Z_V$) and encoded text data (encoding representation $Z_T$) into a single input segment $Z_{VT}$.

At process 350, a response is determined. For example, the GPT model 250 receives the single input segment $Z_{VT}$ generated at process 360 and determines a system response (output 150) from the single input segment. As discussed above, the system response is a response to a current human utterance.

Going back to FIG. 2, in some embodiments the video-grounded dialogue model 200 can be optimized. As discussed above, once the GPT model 250 receives the encodings as the single input segment $Z_{VT}$, the GPT model 250 may determine the system response to the current user utterance.

In some embodiments, the video-grounded dialogue model 200 may be fine-tuned in a multi-task setting with the following objectives: (1) response generation, (2) masked multi-modal modeling, and (3) matching video-text pair (MVT).

In some embodiments, for the response generation, the video-grounded dialogue model 200 may be fine-turned using an objective function that maximizes the likelihood of output target response conditioned on the source sequence. The fine-tuning may occur when the video-grounded dialogue model 200 is trained using known video data and text data.

In some embodiments, masked multi-modal modeling explores a masked language modeling (MLM) loss function and masked visual modeling (MVM) loss function. For example, the video-grounded dialogue model 200 may mask a spatial region 230 and then use the MVM loss function and encoding layers 212-216 and GPT model 250 to regenerate the spatial region as region 232. Similarly, the video-grounded dialogue model 200 may masks a token 234 and then use the MLM loss function and encoding layers 222-226 and GPT model 250 to regenerate the token 226 as token 236. In some examples, the MLM loss function is learned similarly as response generation by passing through a linear layer with a softmax function. In some examples, MVM loss function is learned by minimizing the K-L divergence between the output representation of the masked visual region and the original representation.

In some embodiments, matching video-text pair (MVT) adds a special token [CLS] in the beginning of the input sequence. When the GPT model 250 generates the output representation of the CLS token, the output representation of the CLS token may be used to predict if the video-text pair is correct.

FIG. 4 is a table that illustrates an improvement in using the video-grounded dialogue model over conventional models such as Audio Visual Scene Di-alog (AVSD) model and an MTN model. The improvements are shown on various datasets, such as BLUE1, BLUE2, BLUE3, BLUE4, METEOR, ROUGE-L, and CIDEr. FIG. 4 illustrates shows that the video-grounded dialogue model (VGD-GPT2) that uses either small or medium pre-trained GPT-2 models is an improvement over the AVSD and MTN models. However, there is a slight improvement when the GPT-2 size is increased from small to medium. Table 1 also shows that fine-tuning the video-grounded dialogue model also improves the performance. For example, Table 1 shows that fine-tuning a pre-trained model with multi-task objectives can benefit the main task of response generation. These auxiliary objectives help to adapt the pre-trained model to the current data domain, video-based dialogues. In particular, the MLM and MVM loss functions are used to improve learning of local dependencies in token and spatial levels, while the MVT loss function is used to improve learning global dependencies between text and visual modalities.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for generating a response by a video-grounded dialogue neural network language model in a video grounded dialogue, the method comprising:
   receiving, at the video-grounded dialogue neural network language model, a video input and text input, wherein the text input comprises a dialogue history between the video-grounded dialogue neural network language model and a human user and a current utterance by the human user;
   generating, using a plurality of video encoding layers in the video-grounded dialogue neural network language model, an encoded video input, wherein the encoded video input includes a spatial level encoding and at least one of a modality level encoding, a temporal level encoding, or a position level encoding;
   generating, using a plurality of text encoding layers in the video-grounded dialogue neural network language model, an encoded text input, wherein the encoded text input includes a token level encoding and at least one of a modality level encoding, a turn-level encoding, or a position level encoding;
   concatenating the encoded video input and the encoded text input in to a single input sequence; and
   generating from the single input sequence and using a generative pre-trained transformer model in the video-grounded dialogue neural network language model, the response to the current utterance of the human user.

2. The method of claim 1, wherein a spatial level encoding layer from the plurality of video encoding layers generates the spatial level encoding from the video input, wherein the spatial level encoding includes a spatial region in a video frame.

3. The method of claim 1, wherein a modality level encoding layer from the plurality of video encoding layers generates the modality level encoding from the video input, wherein the modality level encoding identities visual information type of the video input.

4. The method of claim 1, wherein a temporal level encoding layer from the plurality of video encoding layers generates the temporal level encoding from the video input, wherein the temporal level encoding identifies a spatial level position of a frame in the video input.

5. The method of claim 1, wherein a position level encoding layer from the plurality of video encoding layers generates the position level encoding, wherein the position level encoding identifies a spatial level ordering of frames in the video input and spatial ordering of spatial regions within each frame.

6. The method of claim 1, wherein a word level encoding layer from the plurality of text encoding layers generates the word level encoding from the text input, wherein the word level encoding includes a word from the text input.

7. The method of claim 1, wherein a modality level encoding layer from the plurality of text encoding layers generates the modality level encoding from the text input, wherein the modality level encoding identities text information type of a token in the text input that indicates that the token is included in a caption, an utterance of the human user in the dialogue history or a language model response.

8. The method of claim 1, wherein a turn level encoding layer from the plurality of text encoding layers generates the turn level encoding from the text input, wherein the turn level encoding identifies a turn number in the dialogue history that includes a token.

9. The method of claim 1, wherein a position level encoding layer from the plurality of text encoding layers generates the position level encoding, wherein the position level encoding identifies a token ordering in the text input.

10. A system for generating a response for a video grounded dialogue, the method comprising:
a memory configured to store a video-grounded dialogue neural network language model; and
a processor coupled to the memory and configured to:
receive, at the video-grounded dialogue neural network language model, a video input and text input, wherein the text input comprises a dialogue history between the video-grounded dialogue neural network language model and a human user, and a current utterance by the human user;
generate, using a plurality of video encoding layers in the video-grounded dialogue neural network language model, an encoded video input, wherein the encoded video input includes a spatial level encoding and at least one of a modality level encoding, a temporal level encoding, or a position level encoding;
generate, using a plurality of text encoding layers in the video-grounded dialogue neural network language model, an encoded text input, wherein the encoded text input includes a token level encoding and at least one of a modality level encoding, a turn-level encoding, or a position level encoding;
concatenate the encoded video input and the encoded text input in to a single input sequence; and
generate from the single input sequence and using a generative pre-trained transformer model in the video-grounded dialogue neural network language model, the response to the current utterance of the human user.

11. The system of claim 10, wherein a spatial level encoding layer from the plurality of video encoding layers generates spatial level encoding from the video input, wherein the spatial level encoding includes at least one spatial region in a video frame.

12. The system of claim 10, wherein a modality level encoding layer from the plurality of video encoding layers generates the modality level encoding from the video input, wherein the modality level encoding identities information type of the video input as video.

13. The system of claim 10, wherein a temporal level encoding layer from the plurality of video encoding layers generates the temporal level encoding from the video input, wherein the temporal level encoding identifies a spatial level position of a frame in the video input.

14. The system of claim 10, wherein a position level encoding layer from the plurality of video encoding layers generates a position level encoding, wherein the position level encoding identifies a spatial level ordering of frames in the video input and spatial ordering of spatial regions within each frame.

15. The system of claim 10, wherein a word level encoding layer from the plurality of text encoding layers generates word level encoding from the text input, wherein the word level encoding includes a word from the text input.

16. The system of claim 10, wherein a modality level encoding layer from the plurality of text encoding layers generates the modality level encoding from the text input, wherein the modality level encoding identities text information type of the text input that indicates that a token in the text input is part of a caption, an utterance of the human user or a response.

17. The system of claim 10, wherein a turn level encoding layer from the plurality of text encoding layers generates the turn level encoding from the text input, wherein the turn level encoding identifies a turn number in the dialogue history that includes a token.

18. The system of claim 10, wherein a position level encoding layer from the plurality of text encoding layers generates a position level encoding, wherein the position level encoding identifies a token ordering in the text input.

19. A non-transitory machine-readable medium having stored thereon machine-readable instructions executable to cause a machine to perform operations that process a natural language, the operations comprising:
receiving, at a video-grounded dialogue neural network language model, a video input and text input, wherein the text input comprises a dialogue history between the video-grounded dialogue neural network language model and a human user and a current utterance by the human user;
generating, using a plurality of video encoding layers in the video-grounded dialogue neural network language model, an encoded video input, wherein the encoded video input includes a spatial level encoding and at least one of a modality level encoding, a temporal level encoding, or a position level encoding;
generating, using a plurality of text encoding layers in the video-grounded dialogue neural network language model, an encoded text input, wherein the encoded text input includes a token level encoding and at least one of a modality level encoding, a turn-level encoding, or a position level encoding;

concatenating the encoded video input and the encoded text input in to a single input sequence; and generating from the single input sequence and using a generative pre-trained transformer model in the video-grounded dialogue neural network language model, the response to the current utterance of the human user.

20. A non-transitory machine-readable medium of claim 19, wherein the video encodings identify at least one spatial region in a video frame in the video input, a visual information type of the visual frame, a spatial level position of the video frames in the video input, and spatial ordering of the at least one spatial region in the video frame and the video frame; and wherein the text encodings identify a word from the text input, an information type of the word, a turn in the dialogue history associated with the word, and a position of the word in the text input.

* * * * *